United States Patent
Uchiyama et al.

(10) Patent No.: US 6,335,788 B1
(45) Date of Patent: Jan. 1, 2002

(54) OPTICAL-FIBER CHARACTERISTICS MEASURING APPARATUS

(75) Inventors: Haruyoshi Uchiyama; Toshio Kurashima, both of Tokyo (JP)

(73) Assignees: Ando Electric Co., Ltd.; Nippon Telegraph and Telephone Corporation, both of Tokyo (JP)

( * ) Notice: Subject to any disclaimer, the term of this patent is extended or adjusted under 35 U.S.C. 154(b) by 0 days.

(21) Appl. No.: 09/547,063

(22) Filed: Apr. 11, 2000

(30) Foreign Application Priority Data

Apr. 14, 1999 (JP) .............................................. 11-107155

(51) Int. Cl.[7] .............................................. G01N 21/00
(52) U.S. Cl. ....................................................... 356/73.1
(58) Field of Search ........................... 356/73.1; 385/15, 385/27

(56) References Cited

U.S. PATENT DOCUMENTS

| | | | |
|---|---|---|---|
| 5,159,400 A | * 10/1992 | Takeda et al. | 356/73.1 |
| 5,686,986 A | * 11/1997 | Li et al. | 356/73.1 |
| 5,995,228 A | * 11/1999 | Oani et al. | 356/73.1 |

* cited by examiner

Primary Examiner—Frank G. Font
Assistant Examiner—Tu T. Nguyen

(57) ABSTRACT

The present invention relates to an optical-fiber characteristics measuring apparatus that does not require frequency conversion of pulse light which enters an optical fiber to be measured, and does not restrict the cycle period of the pulse light, thereby ensuring fast measuring of the characteristics of the optical fiber. This apparatus comprises an optical directional coupler, an optical pulse generator, a balanced-light reception circuit, a signal generation section and a mixer. The optical directional coupler branches coherent light into first and second coherent lights. The optical pulse generator converts the first coherent light into pulse light which in turn enters an optical fiber to be measured. Returned light whose frequency is shifted from that of the first coherent light by a predetermined frequency through reflection and scattering in the optical fiber to be measured enters the balanced-light reception circuit. The balanced-light reception circuit carries out balanced-light reception of the second coherent light and the returned light and converts the resultant light into an electric signal. The signal generation section generates an RF signal whose frequency is equal to the predetermined frequency. The mixer mixes the electric signal and the RF signal to thereby detect the shifted frequency.

3 Claims, 3 Drawing Sheets

OPTICAL-FIBER CHARACTERISTICS MEASURING APPARATUS

BACKGROUND OF THE INVENTION

1. Field of the Invention

The present invention relates to an optical-fiber characteristics measuring apparatus which measures various characteristics of an optical fiber by emitting an optical pulse to the optical fiber and performing an optical heterodyne detection involving the combination of returned light from the optical fiber with local oscillation light.

2. Description of the Related Art

FIG. 3 is a block diagram illustrating the structure of an optical-fiber characteristics measuring apparatus according to the related art. The operation of this optical-fiber characteristics measuring apparatus will be described below. When a light source 31 emits coherent light 31a of a frequency $f_0$ to an optical directional coupler 32, the coherent light 31a passes through the optical directional coupler 32 and enters an optical pulse generator 33 as coherent light 32a. The optical pulse generator 33 converts this coherent light 32a into pulse light 33a. It is to be noted that the coherent light 32a and the pulse light 33a have the same frequency as the frequency $f_0$ of the coherent light 31a.

Next, an optical frequency converter 34 performs frequency conversion by shifting the frequency of the pulse light 33a by a predetermined frequency $\Delta f$ and sends out coherent light 34a having a frequency "$f_0+\Delta f$". This pulse light 34a travels through an optical amplifier 35, an optical switch 36 and an optical connector 37 and is emitted as pulse light 37a toward an optical fiber 38 to be measured. When this pulse light 37a enters the to-be-measured optical fiber 38, reflection or scattering respectively produces reflected light or scattered light in accordance with the state in the to-be-measured optical fiber 38. Part of the reflected light or scattered light travels as returned light 38a through the optical connector 37 and the optical switch 36. Then, returned light 36b is emitted toward the balanced-light reception circuit 40.

The balanced-light reception circuit 40 converts the returned light 36b into an electric signal through balanced-light reception with the coherent light 32b of the frequency $f_0$ emitted from the optical directional coupler 32. Specifically, an optical directional coupler 41 combines the coherent light 32b and the returned light 36b, and a photoelectric converter 42 converts the combined optical signal into an electric signal which is in turn amplified by an electric signal 43a by an amplifier section 43. This electric signal 43a is input to a signal processing section 46 through a low-pass filter 44 and an amplifier section 45. The signal processing section 46 acquires various characteristics of the to-be-measured optical fiber 38 based on the input electric signal and processes this electric signal on the time axis to prepare the distribution on the distance axis of the to-be-measured optical fiber 38.

According to the conventional optical-fiber characteristics measuring apparatus, as apparent from the above, the optical scheme using the optical frequency converter 34 shifts the frequency of the pulse light 37a to be input to the to-be-measured optical fiber 38 by the predetermined frequency $\Delta f$ with respect to the frequency of the coherent light 31a. Then, the local oscillation light (coherent light 32b) and the returned light 36b are combined, yielding a beat signal. The frequency $\Delta f$ is set in accordance with the frequency of the returned light 36b in such a way that the frequency of the beat signal (i.e., the difference between the frequencies of the local oscillation light and the returned light) lies in an electrically processable range. Accordingly, backward scattered light, such as the Rayleigh scattered light and Brillouin scattered light, and reflected light, which is produced in the to-be-measured optical fiber 38, can be detected as returned light.

The use of such an optical frequency conversion scheme requires that the optical frequency converter 34 should be constituted by an optical frequency shifter or by an optical ring comprising several optical components. This complicates the structure of the optical-fiber characteristics measuring apparatus. When an optical ring system is used, for example, while pulse light is travels along the optical ring, new pulse light cannot be input to the optical ring. This restricts the cycle period of the pulse light that is emitted from the optical ring, thus disabling fast measuring of the characteristics of the to-be-measured optical fiber. In addition, the frequency conversion increases the frequency of the pulse light, thereby restricting the pulse width of the pulse light.

SUMMARY OF THE INVENTION

Accordingly, it is an object of the present invention to provide an optical-fiber characteristics measuring apparatus that has a simple structure which does not require frequency conversion of pulse light to be input an optical fiber to be measured and does not restrict the cycle period of the pulse light, thereby ensuring fast measuring of the characteristics of the optical fiber using a fast optical output.

To achieve the above object, according to one aspect of this invention, there is provided an optical-fiber characteristics measuring apparatus for converting coherent light into pulse light, emitting the pulse light to an optical fiber, converting an optical signal acquired by balanced-light reception of returned light from the optical fiber and the coherent light into a first electric signal, and obtaining characteristics of the optical fiber from a frequency component of the returned light included in the first electric signal, which apparatus comprises signal generation means for generating a second electric signal having a frequency approximately coincident with a frequency of an optical signal to be detected in those optical signals included in the returned light; and mixing means for mixing the first electric signal and the second electric signal to thereby detect a frequency component of the optical signal to be detected.

According to this invention, as specifically described above, the frequency component of the desired optical signal is detected by producing a first electric signal by conversion of the optical signal that is acquired by the balanced-light reception of returned light and coherent light, producing a second electric signal whose frequency approximately matches with the frequency of the optical signal to be detected of optical signals included in returned light, and then mixing the first and second electric signals together. In the case of detecting the returned light by using a beat signal obtained by combining the returned light and local oscillation light (coherent light), therefore, the frequency component of the optical signal included in the returned light can be detected even if the frequency band of the signal processor for acquiring the characteristics of an optical fiber is not matched with the frequency component of the beat signal. This can ensure excellent coherent detection according to the frequency component of reflected light or any of various kinds of scattered lights contained in the returned light. Further, it is unnecessary to shift the frequency of the pulse light to be sent to an optical fiber, thus eliminating the need for a circuit, such as an optical frequency shifter or an optical ring system. This can help make the structure of the optical-fiber characteristics measuring apparatus simpler. Furthermore, there is no restriction on the cycle period of pulse light, so that the pulse light can be emitted in a shorter period, thereby ensuring fast measuring of the characteristics of the optical fiber.

In this optical-fiber characteristics measuring apparatus, the signal generation means may detect a spectrum of the optical signal to be detected by changing the frequency of the second electric signal over a spectrum width of the optical signal to be detected.

In this case, the spectrum of the optical signal to be detected is detected by changing the frequency of the second electric signal over the spectrum width of the to-be-detected optical signal. Therefore, even if the spectrum width of an optical signal contained in the returned light is wider than the spectrum width of the second electric signal as in the case of scattered light, therefore, the spectrum of every optical signal contained in the returned light can be detected.

Furthermore, in this case or in the optical-fiber characteristics measuring apparatus of the above aspect, the signal generation means may set the frequency of the second electric signal in accordance with a type of the optical signal to be detected.

DETAILED DESCRIPTION OF THE PREFERRED EMBODIMENT

Figure 1:
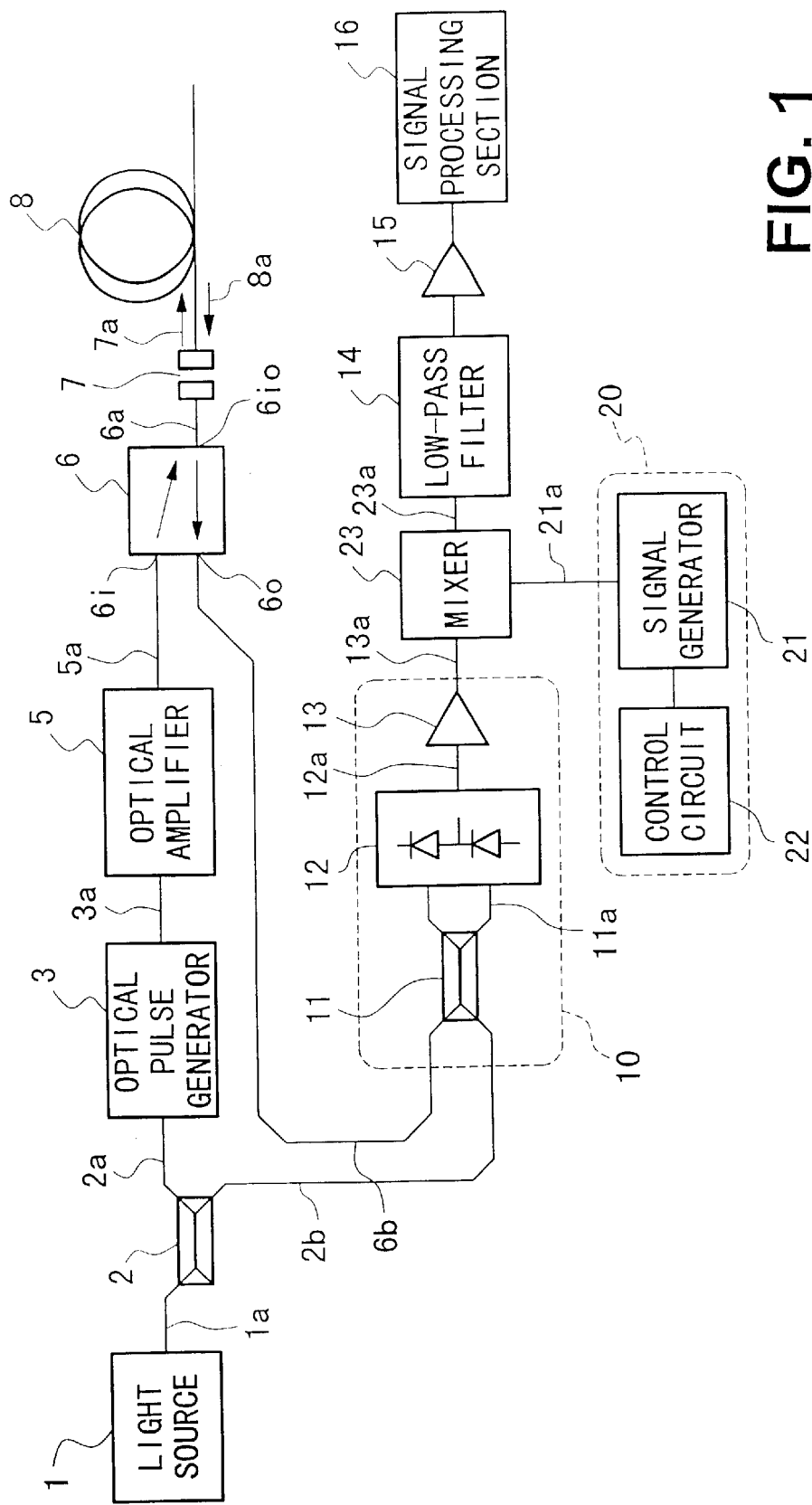
FIG. 1 is a block diagram illustrating the structure of an optical-fiber characteristics measuring apparatus according to one embodiment of the present invention.

One preferred embodiment of the present invention will now be described with reference to the accompanying drawings. FIG. 1 is a block diagram illustrating the structure of an optical-fiber characteristics measuring apparatus according to this embodiment of this invention.

In this embodiment, a light source 1 is an MQW-DFB (Multiple Quantum Well-Distribution FeedBack) semiconductor laser or the like of the 1.5 μm band, which emits coherent light 1a having a narrow band. The continuous light emitted from the light source 1 has a frequency $f_0$. A 1×2 optical directional coupler 2 has one input port and two output ports. This optical directional coupler 2 separates the coherent light 1a entering the input port into two components and respectively outputs them as coherent lights 2a and 2b from the two output ports.

An optical pulse generator 3 is an E/O (Electric/Optical) switch or the like and converts the coherent light 2a into pulse light 3a having a pulse width of several nanoseconds to several microseconds through the ON/OFF action of that switch. The period of generating this pulse light 3a depends on the length of an optical fiber 8 to be measured (i.e., the distance range). For example, the generation period of the pulse light 3a is 200 μ sec for the distance range of 10 km and is 20 μ sec for the distance range of 1 km.

An optical amplifier 5 is an optical fiber amplifier, which uses an Er (Erbium) doped fiber, or the like. This optical amplifier 5 amplifies the incident pulse light 3a to a predetermined level and outputs the amplified light. An optical switch 6, which is an optical circulator or the like, sends pulse light 5a, input to its input port 6i, to an optical connector 7 as coherent light 6a from an output/input port 6io. The optical switch 6 also outputs returned light, which enters the output/input port 6io via the optical connector 7 from the to-be-measured optical fiber 8, from an output port 6o as returned light 6b.

Of the optical signals contained in the returned light, the Brillouin scattered light has a frequency shift of about 9 to 12 GHz with respect to the frequency $f_0$ of the pulse light input to the to-be-measured optical fiber 8. That is, with $f_s$ being the frequency shift, the frequency, $f_b$ of the returned light 6b or returned light 8a becomes "$f_0-f_s$". With regard to the Rayleigh scattered light or reflected light, the frequency shift $f_s$ is "0", so that the frequency $f_b(=f_0-f_s)$ is equal to the frequency $f_0$.

The individual constituent sections of a balanced-light reception circuit 10 will now be discussed. An optical directional coupler 11 combines the coherent light 2b of the frequency $f_0$ sent from the optical directional coupler 2 and the returned light 6b of the frequency $f_b(=f_0-f_s)$. The frequency components of an optical signal 11a which is acquired by the light combination are $f_s \pm (f_0-f_s)$, that is, $2f_0-f_s$ or $f_s$. An photoelectric converter 12 converts this optical signal 11a into a electric signal 12a. An amplifier section 13 amplifies the electric signal 12a to a level suitable for a mixer 23 (to be discussed later) to process, and outputs a resultant electric signal 13a.

The individual constituent sections of a signal generation section 20 will now be discussed. A signal generator 21 generates an RF (Radio Frequency) signal 21a having a sinusoidal wave or the like. A control circuit 22 sets the frequency, $f_r$, of this RF signal 21a. The set value of the frequency $f_r$ varies depending on an optical signal to be detected in the returned light; for example, the frequency $f_r$ is set to approximately 8 to 12 GHz in a case of detecting the Brillouin scattered light and is set to approximately 10 kHz in a case of detecting the Rayleigh scattered light or reflected light.

The mixer 23 mixes the electric signal 13a output from the balanced-light reception circuit 10 with the RF signal 21a output from the signal generation section 20 and outputs an electric signal 23a which is the electric signal 13a whose frequency is lowered by the frequency $f_r$ of the RF signal 21a. As the frequency $f_r$ of the RF signal 21a is set close to the frequency shift $f_s$ of the returned light, of the above four frequency components, the frequency component that is acquired by lowering the frequency shift $f_s$ by the frequency $f_r$ approaches a DC component. This frequency component therefore lies in a frequency range which is easily processable by electric circuits (specifically, a low-pass filter 14, an amplifier section 15 and a signal processing section 16) located at the subsequent stage of the mixer 23.

The low-pass filter 14 eliminates a high-frequency component, such as noise, from the electric signal 23a output from the mixer 23, thereby improving the S/N (Signal/Noise) ratio. The amplifier section 15 amplifies the electric signal output from the low-pass filter 14 to a level suitable for the signal processing section 16 to process. The signal processing section 16 has various capabilities for performing various kinds of signal processing, such as addition of the electric signal output from the amplifier section 15. With those capabilities, the signal processing section 16 carries out averaging of the input electric signals to acquire the deformation and loss of the to-be-measured optical fiber 8 and detects the returned light on the time axis to acquire the distance distribution of the deformation characteristic and optical loss characteristic.

A description will now be given of the operation of the thus constituted opticalfiber characteristics measuring apparatus. When the light source 1 emits the coherent light of the frequency $f_0$, the optical directional coupler 2 branches the coherent light 1a into two directions and sends one coherent light 2b to the balanced-light reception circuit 10. The optical pulse generator 3 converts the coherent light 2a to the pulse light 3a and sends the pulse light 3a to the optical amplifier 5. The optical amplifier S sends the pulse light 5a, acquired by amplifying the pulse light 3a, to the input port 6i of the optical switch 6. The optical switch 6 sends the input pulse light 5a as the pulse light 6a to the optical connector 7. The optical connector 7 sends the received pulse light 6a as the pulse light 7a to the to-be-measured optical fiber 8. Unlike in the related art, the frequency of the pulse light 7a has not undergone any frequency shifting and is the same as the frequency $f_0$ of the coherent light $2_a$.

When this pulse light 7a enters the to-be-measured optical fiber 8, light reflection or scattering occurs in accordance with the state of the to-be-measured optical fiber 8, yielding reflected light or scattered light. Part of the reflected light or scattered light returns to the optical connector 7 as the returned light 8a. Because the returned light 8a undergoes a specific frequency shift $f_s$ in the scattering phenomenon as mentioned above, the frequency $f_b$ of the returned light 8a becomes $f_0-f_s$. Then returned light 8a is then sent out from the output/input port 6io of the optical switch 6 after passing through the optical connector 7, and enters the balanced-light reception circuit 10 as the returned light 6b.

In the balanced-light reception circuit 10, the optical directional coupler 11 combines the coherent light 2b of the frequency $f_0$ and the returned light 6b of the frequency $f_b$, and the photoelectric converter 12 converts the resultant pulse light 11a into the electric signal 12a. As mentioned above, the frequency components contained in the electric signal 12a become $f_0 \pm f_b (= f_0 \pm (f_0-f_s))$. The amplifier section 13 sends the electric signal 13a, obtained by amplifying the electric signal 12a, to the mixer 23. Meanwhile, the control circuit 22 in the signal generation section 20 controls the signal generator 21 to set the frequency $f_r$ of the RF signal 21a sent to the mixer 23 to the same frequency as the frequency shift $f_r$. At this time, the control circuit 22 sets the value of the frequency $f_r$ in accordance with the frequency shift $f_s$ that varies depending on the optical signal to be detected (the Rayleigh scattered light, the Brillouin scattered light, the reflected light or the like).

Next, as the mixer 23 mixes the electric signal 13a with the RF signal 21a to lower the frequency of the electric signal 13a by the frequency $f_r$, only the frequency component of the frequency shift $f_s$ is reduced close to the DC component. This yields the electric signal 23a which contains only the frequency component equivalent to the pulse width of the pulse light 3a. That is, of the four frequency components contained in the electric signal 13a, only the frequency component of the frequency $f_0-f_b(=f_s)$ is detected, so that the electric circuits located at the subsequent stage of the mixer 23 can process only the electric signal that is equivalent to the returned light produced in the to-be-measured optical fiber 8. Then, the low-pass filter 14 eliminates the high-frequency component from the electric signal 23a and sends the resultant signal to the amplifier section 15. The amplifier section 15 amplifies the output signal of the low-pass filter 14 and sends the amplified signal to the signal processing section 16. As mentioned earlier, the signal processing section 16 acquires the deformation characteristic and optical loss characteristic associated with the to-be-measured optical fiber 8 and the distance distribution of those characteristics.

Figure 2:
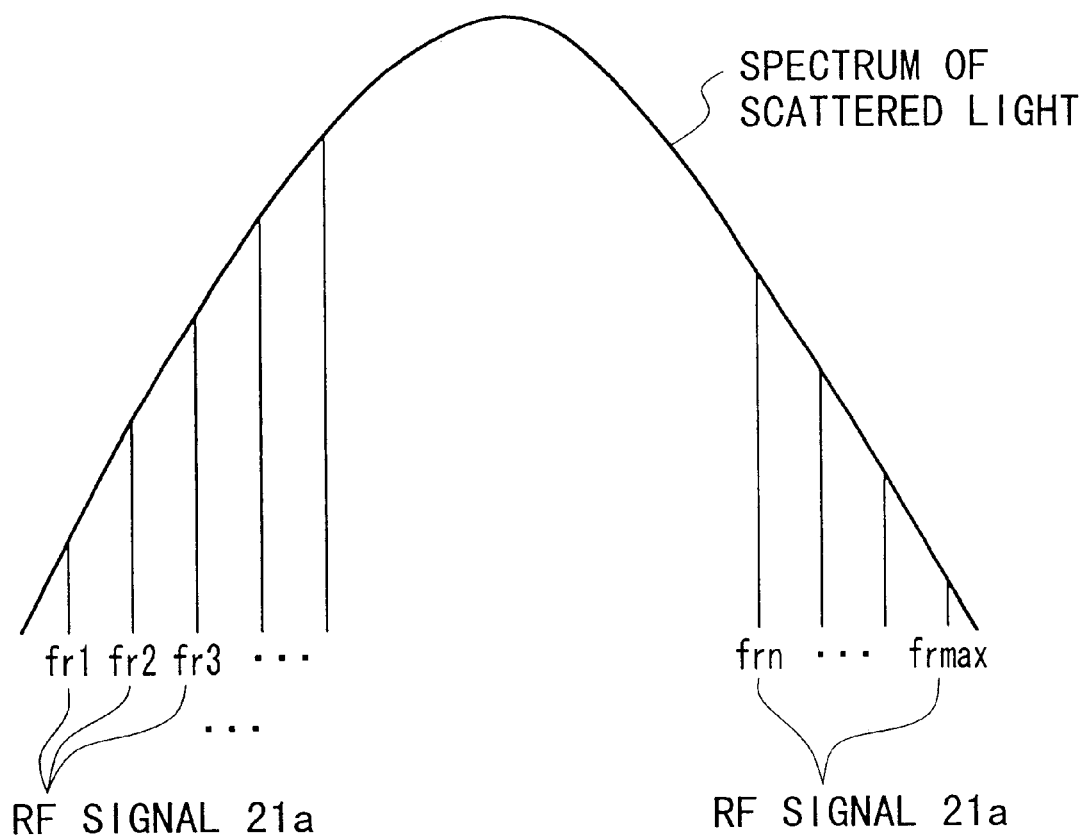
FIG. 2 is an explanatory diagram showing the frequency, $f_r$, of an RF signal to be set with respect to the spectrum of scattered light.
Figure 3:
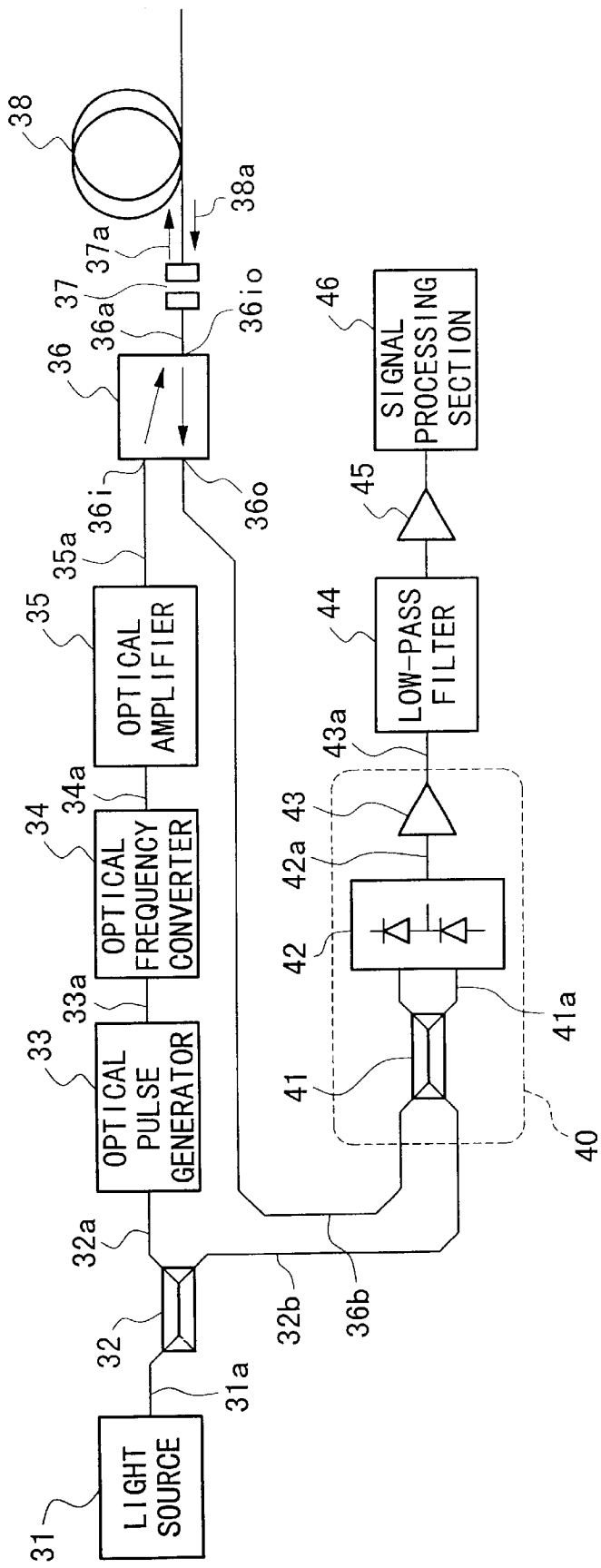
FIG. 3 is a block diagram illustrating the structure of an optical-fiber characteristics measuring apparatus according to the related art.

As in a case of scattered light, the spectrum width of the returned light 6b or 8a may become wider than the spectrum width of the RF signal 21a. In this case, the control circuit 22 controls the signal generator 21 to sequentially change the frequency fr of the RF signal 21a in a predetermined range in an order of $f_{r1}, f_{r2}, f_{r3}, \ldots, f_{rn}, \ldots$, then to $f_{rmax}$ as illustrated in FIG. 2. The spectrum of every returned light from the to-be-measured optical fiber 8 can be detected by detecting the electric signal of each of those frequencies in association with this frequency change by means of the signal processing section 16.

What is claimed is:

1. An optical-fiber characteristics measuring apparatus comprising:

a light source that emits coherent light;

an optical pulse generator that converts the coherent light into pulse light and emits the pulse light into an optical fiber;

an optical coupler that mixes the coherent light generated by the light source and returned light from the optical fiber and outputs mixed optical signal;

a photoelectric converter that converts the mixed optical signal into a first electric signal;

a signal generator that generates a second electric signal having a frequency corresponding to a frequency of an optical signal to be detected included in the returned light;

a mixer that mixes the first electric signal and the second electric signal to detect a frequency component of the optical signal to be detected; and a signal processor that evaluates characteristics of the optical fiber from the frequency component of the optical signal to be detected.

2. An optical-fiber characteristics measuring apparatus according to claim 1, wherein the signal generator detects a spectrum of the optical signal to be detected by changing the frequency of the second electric signal over a spectrum width of the optical signal to be detected.

3. An optical-fiber characteristics measuring apparatus according to claim 1, wherein the signal generator controls the frequency of the second electric signal in accordance with a type of the optical signal to be detected.

\* \* \* \* \*